US012781863B2

(12) United States Patent
Hayes-Pankhurst

(10) Patent No.: US 12,781,863 B2
(45) Date of Patent: Nov. 3, 2026

(54) LOW FLOW PRESSURE CHECK VALVE

(71) Applicant: PSG Germany GmbH, Duisburg (DE)

(72) Inventor: Paul Hayes-Pankhurst, London (GB)

(73) Assignee: PSG Germany GmbH, Duisburg (DE)

( * ) Notice: Subject to any disclaimer, the term of this patent is extended or adjusted under 35 U.S.C. 154(b) by 481 days.

(21) Appl. No.: 18/140,952

(22) Filed: Apr. 28, 2023

(65) Prior Publication Data

US 2024/0360912 A1 Oct. 31, 2024

(51) Int. Cl.
*F16K 15/14* (2006.01)

(52) U.S. Cl.
CPC ................................ *F16K 15/1471* (2021.08)

(58) Field of Classification Search
CPC ............. Y10T 137/7885; F16K 15/147; F16K 15/1471; F16K 15/1401; F16K 15/1402; F16K 15/031; B65D 47/2031
See application file for complete search history.

(56) References Cited

U.S. PATENT DOCUMENTS 2,644,663 A * 7/1953 Klingler ................ F16K 15/147 137/845
3,861,416 A 1/1975 Wichterle
4,053,084 A 10/1977 Anderson
4,203,834 A 5/1980 Martin
4,991,745 A * 2/1991 Brown ................... B65D 35/12 137/493
6,035,896 A * 3/2000 Liardet ............... A61M 16/208 137/849
6,089,411 A * 7/2000 Baudin .............. B65D 47/2031 222/546
6,672,487 B1 * 1/2004 Lohrman ........... B65D 47/0804 222/546
10,287,066 B2 5/2019 Hatton et al.
10,335,561 B2 7/2019 Kruger
10,610,678 B2 4/2020 Martin
10,722,915 B2 7/2020 Gaus et al.
2006/0131328 A1 6/2006 Anderson
2007/0289991 A1 12/2007 Jensen
2023/0029125 A1 1/2023 Tatu et al.

FOREIGN PATENT DOCUMENTS

EP 2489601 A1 * 8/2012 ............. B65D 35/10

OTHER PUBLICATIONS

Machine English translation of EP-2489601-A1 (Year: 2025).*
(Continued)

*Primary Examiner* — Hailey K. Do
(74) *Attorney, Agent, or Firm* — Fish & Richardson P.C.

(57) ABSTRACT

Methods and systems include a check valve including a valve body formed from a resilient material, the valve body having an inlet side and an outlet side. The valve body includes a rim forming an outer periphery of the valve body, and a hinge section comprising an annular groove formed on the inlet side of the valve body radially inward of and adjacent to the rim. The valve body also includes a plurality of lips formed at a center of the valve body by one or more slits extending radially outward from the center of the valve body towards the hinge. The hinge section is co-planar with the plurality of lips when in a closed position.

26 Claims, 9 Drawing Sheets

(56) References Cited

OTHER PUBLICATIONS

International Search Report and Written Opinion in International Appln. No. PCT/EP2024/061697, mailed on Jul. 4, 2024, 19 pages.
vernay.com[online], "Consumer | New Products from Vernay," available on or before Mar. 9, 2022, via Internet Archive: Wayback Machine URL <https://web.archive.org/web/20220309105004/https://www.vernay.com/Products/New-Products/Consumer>, retrieved on Feb. 26, 2024, URL<https://www.vernay.com/Products/New-Products/Consumer>, 2 pages.

* cited by examiner

LOW FLOW PRESSURE CHECK VALVE

TECHNICAL FIELD

The present application relates to dispensing fluids.

BACKGROUND

Fluid dispensing systems can include a source of fluid and a valve to control the flow of the fluid. For example, a reservoir of fluid can be positioned above a valve in which case the valve can be a check valve and provide a check against the pressure from the head of the reservoir. Alternatively, the reservoir may be positioned below the valve, and the valve provides a check against a negative pressure. There are a wide range of fluids with different thermophysical and transport properties that can be dispensed through such a system.

Various valve geometries can be used in such systems, but each produces undesirable effects. For example, Duckbill valves do not provide a check pressure against forward flow pressure. There are no forces acting on the Duckbill valve lips to keep them in face-to-face contact resulting in the potential for build-up of congealed fluid on the exterior of the valve lips. For Umbrella & Mushroom valves the output flow is radial to the supply tube which requires redirecting the flow into the user's receptacle. Such flow redirection components downstream of the valve have the potential to harbour fluid which may become congealed.

As another example, a Cruciform valve uses a relatively thick disc of resilient material and a knife cross-cut creates four valve lips radiating from the axis that flex open under flow pressure. However, in such valves it is not possible to have both a low high-flow pressure and a high opening check pressure. A Dome valve is similar to the Cruciform valve but has a central portion that is domed with a cross-cut to form the valve lips. However, the valve does not function well with low viscosity fluids because the inversion of the dome is not always perfectly symmetrical which causes a jet of fluid to be ejected radially from the valve lips both as the valve opens and again as it closes. A further problem with a dome valve is that air can be sucked past the valve in a reverse flow condition while the valve is closing if the volume of the reverse flow is not precisely controlled. This is often undesirable because the ingress of air past the valve can cause airborne bacterial contamination and/or oxidation of the fluid.

A valve with improved flow characteristics is desirable for fluid dispensing systems.

SUMMARY

This disclosure describes systems and methods for dispensing fluids.

In one aspect, a check valve includes a valve body formed from a resilient material, the valve body having an inlet side and an outlet side and including a rim forming an outer periphery of the valve body; a hinge section including an annular groove formed on the inlet side of the valve body radially inward of and adjacent to the rim; and a plurality of lips formed at a center of the valve body by one or more slits extending radially outward from the center of the valve body towards the hinge, and the hinge section is co-planar with the plurality of lips when in a closed position.

In one aspect, dispensing system includes a reservoir; a pump including an inlet and an outlet, the inlet fluidly coupled to the reservoir; a valve fluidly coupled to the outlet of the pump, the valve including a valve body formed from a resilient material, the valve body having an inlet side and an outlet side and including a rim forming an outer periphery of the valve body; a hinge section including an annular groove formed on the inlet side of the valve body radially inward of and adjacent to the rim; and a plurality of lips formed at a center of the valve body by one or more slits extending radially outward from the center of the valve body towards the hinge, and a surface extending at least from the center to and including the hinge is planar on the outlet side of the valve body.

In one aspect, a method for dispensing a fluid includes opening a valve by providing a fluid pressure to an inlet side of the valve, the fluid pressure being larger than a check pressure of the valve; dispensing the fluid through the valve; and closing the valve by providing a negative pressure to the inlet side of the valve.

In one aspect, a valve includes a valve body formed from a resilient material, the valve body including an inlet side; an outlet side including a planar surface; a rim having a first thickness and forming an outer periphery of the valve body; a hinge section having a second thickness and positioned inward of and adjacent to the rim, the hinge section defining a pivot point disposed closer to the outlet side than to the inlet side; and a plurality of lips having a third thickness larger than the second thickness, the plurality of lips formed at a center of the valve body by one or more slits extending radially outward from the center of the valve body towards the hinge section.

Implementations of these aspects can include one or more of the following features.

In some implementations, a surface extending at least from the center to and including the hinge is planar on the outlet side of the valve body.

In some implementations, the annular groove includes a triangle shape, a square shape, a pentagon shape, or a hexagon shape.

In some implementations, a thickness of the hinge section is less than a thickness of the plurality of lips. In some cases, the annular groove defines a hinge point of the plurality of lips that is offset from a vertical center of the valve body towards the outlet side of the valve body.

In some implementations, a check pressure of the check valve is determined by an offset distance between a hinge point of the plurality of lips and a midpoint of a thickness of the plurality of lips. In some cases, the offset distance is determined by a depth of the annular groove.

In some implementations, these aspects include an annular seal bead protruding from the rim on the inlet side of the valve body.

In some implementations, these aspects include a closed position where edges of the plurality of lips are in-plane with the valve body preventing fluid communication through the valve; and an open position wherein the plurality of lips are hinged outward from the valve body allowing fluid communication from the inlet side to the outlet side, and a pressure to maintain the check valve in the open position is less than a check pressure of the check valve.

In some implementations, these aspects further include a ring that defines a central opening in the ring, the ring connected to the outlet of the pump, and the rim of the valve is retained between the ring and the outlet of the pump.

In some implementations, the valve provides a check pressure against forward flow, the check pressure being greater than a hydrostatic pressure from fluid in the reservoir with the reservoir full.

In some implementations, the pump provides sufficient pressure to open the valve.

In some implementations, these aspects include a closed position where edges of the plurality of lips are in-plane with the valve body preventing fluid communication through the valve; and an open position where the plurality of lips are hinged outward from the valve body allowing fluid communication from the inlet side to the outlet side, and the edges of the plurality of lips on the inlet side of the valve body are compressed when transitioning from the closed position to the open position.

In some cases, the valve is configured to transition from the open position to the closed position in response to a negative pressure at the inlet side. In some cases, no air is entrained into the reservoir when the valve transitions from the open position to the closed position.

In some implementations, the valve and the pump are integrated with the reservoir as a single use item.

In some implementations, a reverse check pressure of the valve is determined by an inner diameter of the outlet of the pump.

In some implementations, these aspects further include a backing washer with an inner diameter smaller than an inner diameter of the outlet of the pump, the backing washer positioned between the outlet of the pump and the inlet side of the valve body, and a reverse check pressure of the valve is determined by the inner diameter of the backing washer.

In some implementations, closing the valve includes providing the negative pressure by reversing a flow direction of the fluid.

In some implementations, dispensing the fluid includes a fluid flow pressure less than the check pressure of the valve.

In some implementations, closing the valve does not introduce air through the valve.

In some implementations, closing the valve includes the valve closing symmetrically.

In some implementations, closing the valve includes the valve closing without dripping the fluid being dispensed.

In some implementations, the third thickness increases from the hinge section to the center of the valve body.

Particular implementations of the subject matter described in this specification can be implemented to realize one or more of the following advantages. The check valve can provide a high check pressure and a low flow pressure at a high-flow rate. The check valve can be closed without introducing air into the fluid reservoir reducing risk of contaminating the reservoir fluid. The check valve can close in a dripless manner preventing buildup on the outlet side of the valve. The check valve can dispense fluids having a wide range of thermophysical and transport properties. The check valve can open and close in a symmetric manner preventing errant jets and sprays of fluid from the reservoir during opening or closing events. The check valve can have differing opening check pressure and closing check pressure. The thick valve lips of the check valve can locally deform around particulate (e.g., seeds or fibers) and still form a seal when in the closed position.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1B:
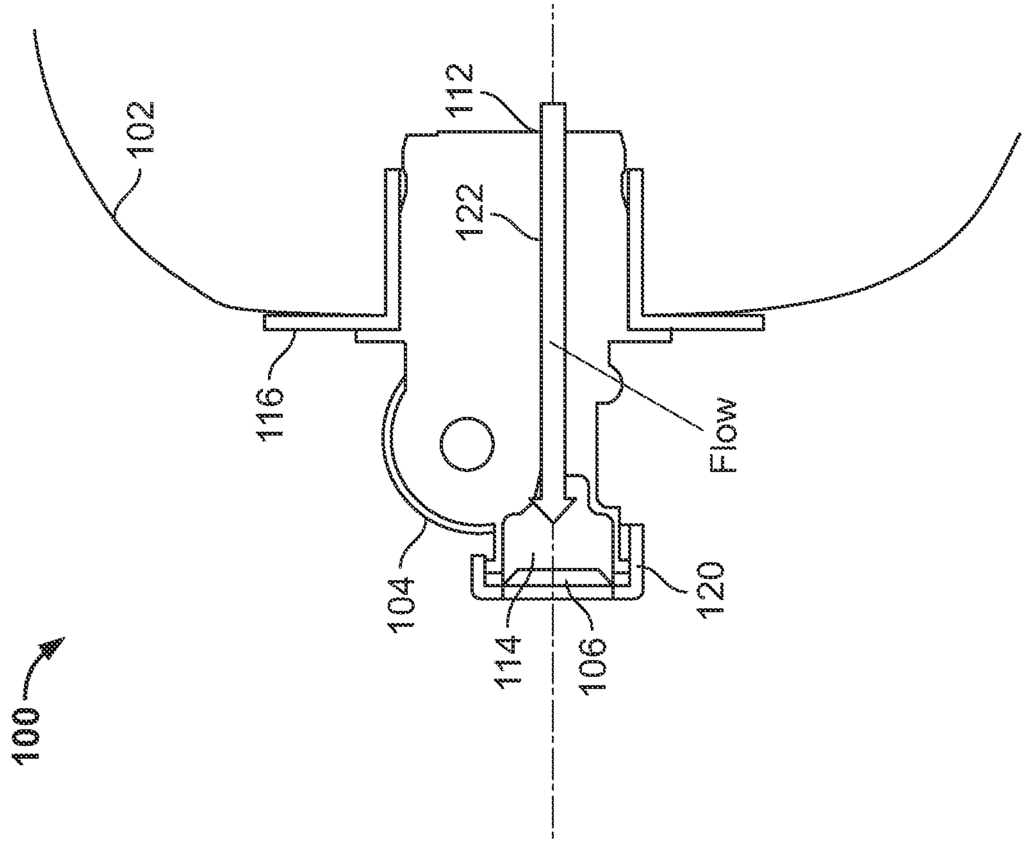
FIGS. 1A-1B show an example fluid dispensing system.
Figure 1A:
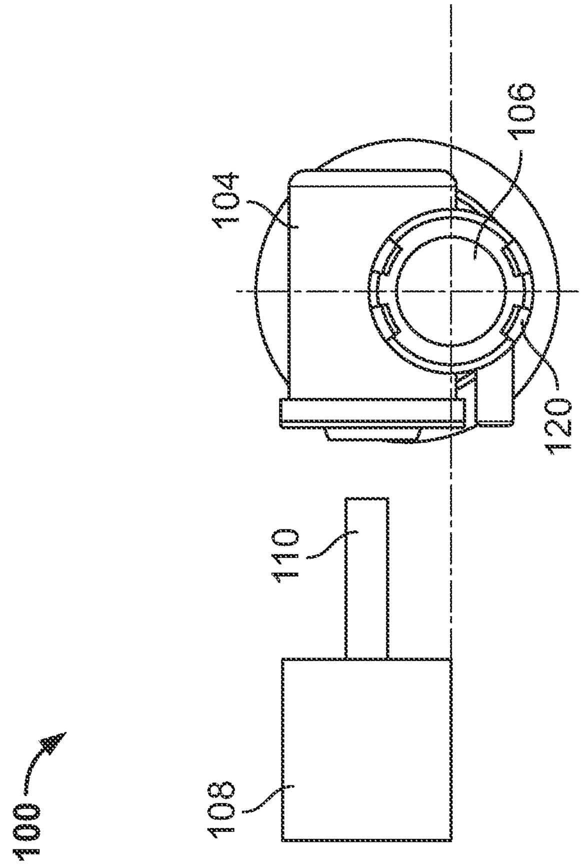

FIGS. 1A-1B show an example system 100 for dispensing fluids. The system includes a fluid reservoir 102, a pump 104, and a valve 106. A fluid dispensing system can be used to dispense fluids into separate containers. For example, a fluid dispensing system can be used in a supermarket where consumers can refill smaller containers of fluid products (e.g., condiments, beverages, soaps, laundry detergent, etc.) from a larger bulk container. The system can be oriented in any orientation. For example, the fluid reservoir 102 can be located above, below or to the side of the valve 106. The valve 106 can provided a check pressure larger than a hydrostatic pressure from the fluid reservoir 102. The pump 104 can be, e.g., a rotary pump. Further, the pump 104 can provide a pressure large enough to overcome the check pressure and open the valve 106 to dispense fluid from the reservoir 102 and a vacuum pressure large enough to close the valve 106.

The pump 104 can control the dispensing of the fluid. For example, the pump 104 can dispense a specified volume of the fluid. The pump 104 is connected to a motor 108 via a drive shaft 110. The pump 104 has an inlet 112 and an outlet 114. The inlet 112 of the pump can be fluidly coupled to the fluid reservoir 102, for example, through a bag gland 118. The outlet 114 of the pump is fluidly coupled to the valve 106. The valve 106 can be retained at the outlet 114 of the pump by a retaining ring 120. The retaining ring 120 includes a circular opening and an annular rim allowing the fluid to be dispensed through the valve 106 and through the center of the retaining ring 120. The forward direction of fluid flow 122 is from the fluid reservoir to the inlet 112 of the pump 104, through the pump 104 from the inlet 112 to the outlet 114, and from the outlet 114 through the valve 106. In some cases, the pump 104 can pump the fluid in a reverse direction, e.g., by being rotated in reverse. In some cases, a pipe, tube or hose can be used to fluidly couple the pump outlet 114 to the valve 106.

In some implementations, the fluid dispensing system 100 can be provided as a disposable single use item including the reservoir 102, the pump 104, and the valve 106. The fluid dispensing system 100 can include an identifier such as a barcode, a QR code or an RFID tag used, e.g., to identify a type of fluid contained in the reservoir 102. The fluid dispensing system 100 can be inserted into a receptacle that identifies the system based on the identifier and activates pre-configured dispensing parameters based on the identified fluid dispensing system 100.

In some implementations, the fluid dispensing system 100 can be a squeeze bottle and the valve 106 can be installed in the cap of the squeeze bottle. With the valve 106 installed, the squeeze bottle can form a "no-drip" container. For example, when the squeeze bottle is squeezed or compressed, the valve 106 can open symmetrically without forming any sprays or drips. When the squeeze bottle is released, a negative pressure is formed on the inlet side of the valve 106 and the valve 106 closes symmetrically without forming spurious fluid jets, sprays or drips. A reverse check pressure of the valve can also prevent air from being drawn into the squeeze bottle where the vacuum pressure exerted by the squeeze bottle is lower than the reverse check pressure of the valve.

Figure 2A:
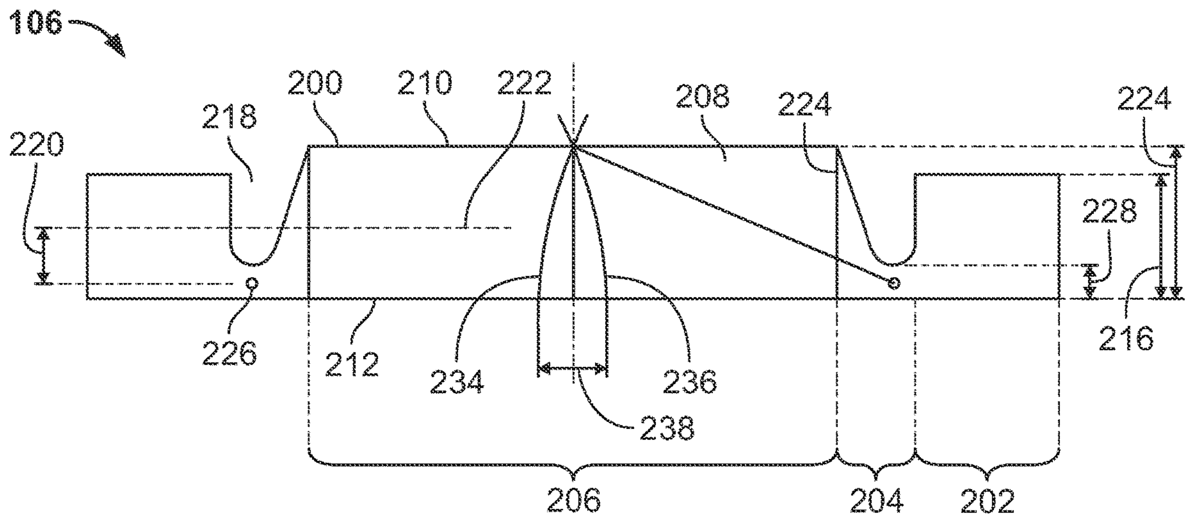
FIGS. 2A-2B show an example valve for dispensing fluids in a closed position.
Figure 2B:
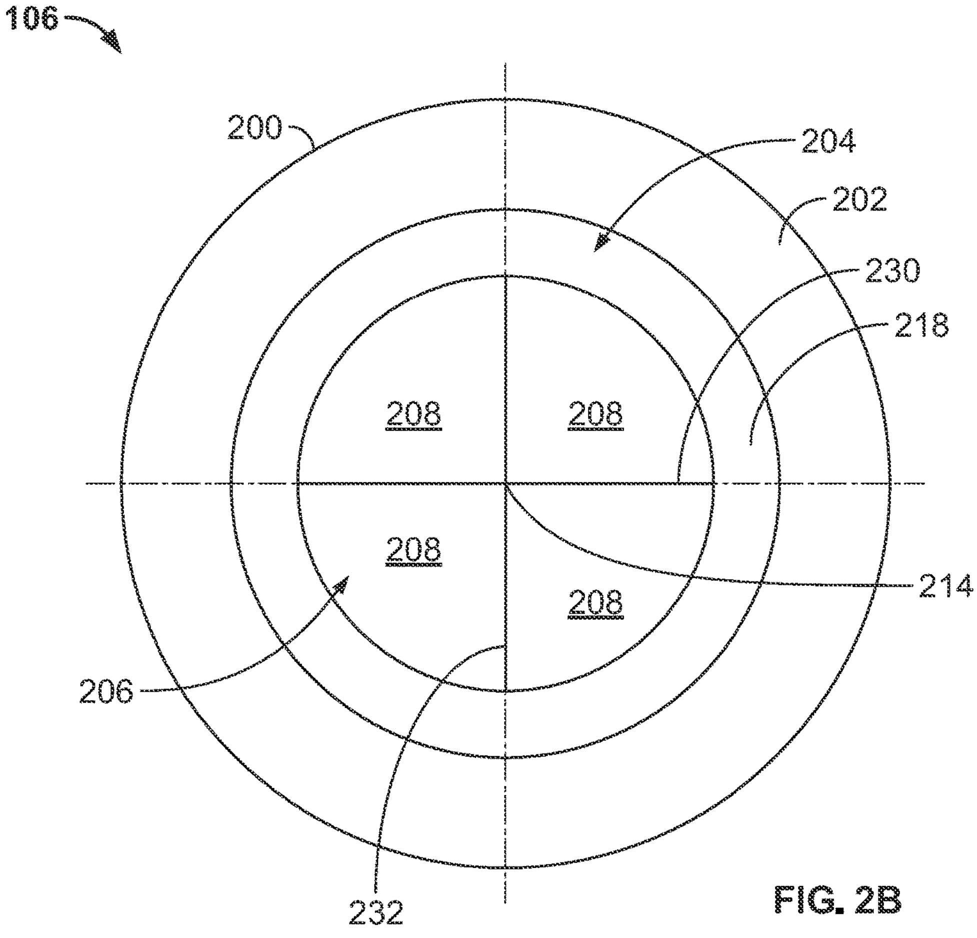
Figure 3A:
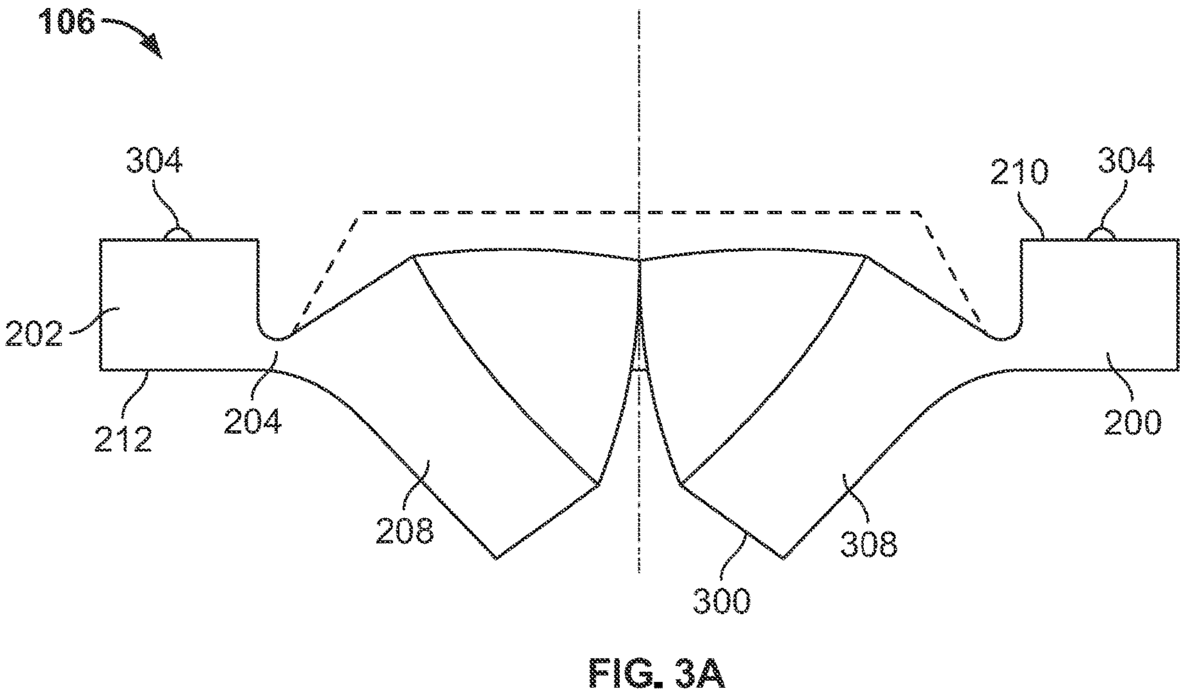
FIGS. 3A-3B show an example valve for dispensing fluids in an open position.

FIG. 2A shows a cross section view of an example valve 106, and FIG. 2B shows a plan view of the example valve 106. The valve 106 includes a valve body 200 that defines a rim 202, a hinge section 204, and a center portion 206. A plurality of valve lips 208 are formed in the center portion 206. The valve body 200 is formed out of a resilient material. Examples of resilient materials include silicone rubber, polyurethane, rubber modified polypropylene, natural rubber, synthetic rubber such as EPDM. Desired properties are low creep, high elongation, high rebound, inert to fluid being checked. The valve body includes an inlet side 210 and an outlet side 212. The outlet side 212 can be planar. The hinge section 204 and the valve lips 208 can be co-planar when the valve is in a closed position. For instance, while the thickness of the valve lips 208 can extend outside of a common plane with the hinge section 204, in some implementations, at least a portion of the valve lips 208 in a radial direction are co-planer with the hinge section 208. However, when the valve 106 opens (as shown in FIG. 3A) the edge portions of the valve lips extend outside of a plane that contains the hinge section 208.

In some implementations, the outlet side 212 can be slightly concave or slightly convex. The valve body 200 can have a circular shape in the plan view. In some implementations, the outlet side 212 is planar from the center 214 to the hinge section 204. The rim 220, hinge section 204, and center portion 206 have respective thicknesses 216, 228, and 224 as measured between the inlet side 210 and the outlet side 212. The thickness 228 of the hinge section 204 is less than the thicknesses 216 and 224 of the rim 220 and center portion 206. In some examples, such as that shown in FIG. 2A, the center portion 206 is thicker than the rim 202.

The rim 202 forms an outer periphery of the valve body 200. The rim 202 has a thickness 216. The hinge section 204 is radially inward from and adjacent to the rim 202. The hinge section 204 is defined by an annular groove 218. The annular groove 218 forms a pivot point 226 in the thin portion 228 of the valve body 200 between the bottom of the annular groove 218 and the outlet side 212 of the valve 106. The annular groove 218 is formed in the inlet side 210 of the valve body 200 such that there is an offset 220 between a mid-point 222 of the thickness 224 of the center portion 206 of the valve body 200 and the pivot point 226. The rim supports the thick center portion 206 via the thin hinge section 204. The location of the pivot point 226 can be adjusted by adjusting the depth of the annular groove 218.

The center portion 206 includes a plurality of lips 208 defined by slits 230 and 232. In this example, slits 230 and 232 are the same length. The slits 230 and 232 can be formed by, for example, a knife cross-cut. The slits 230 and 232 penetrate all of the way through the valve body 200 from the inlet side 210 to the outlet side 212. In this example, four valve lips 208 are defined by the slits 230 and 232. The slits 230 and 232 extend radially outward from the center 214 toward the hinge section 204. In various examples, the valve 106 can have more or fewer valve lips 208.

The valve body has a closed position and an open position. In the closed position (shown in FIGS. 2A-2B), the valve lips 208 are aligned in the plane of the valve body 200, and the edges of the valve lips 208 formed at the slits 230 and 232 are in contact preventing fluid from passing through the valve. In the open position, the valve lips 208 flex outward at the hinge portion 204 forming an opening through which fluid can flow. As the valve 106 transitions from the closed position to the open position the inlet side 210 of the valve lips 208 must compress as a result of the offset 220 between the mid-point 222 and the pivot point 226. The point of the valve lips 208 travels along the path shown by lines 234 and 236. The distance 238 between the lines 234 and 236 represents the amount that the valve lips 208 must compress while transitioning from the closed position to the open position. The force required to compress the valve lips 208 determines the check pressure of the valve. The check pressure can be adjusted by adjusting the thickness 224 of the valve lips, by adjusting a diameter of the annular groove 218, by adjusting the depth of the annular groove 218, by adjusting a length of the slits 230 and 232, and/or by adjusting the stiffness of the resilient material of the valve body 200. The valve lips 208 are not compressed in the open position nor in the closed position. The valve lips 208 pass through a point of compression during the transition from the closed position to the open position and during the transition from the open position to the closed position. In some example, uniformity of the shape of the valve lips 208 and the size of the slits 230, 232 allow the valve to open and close symmetrically (e.g., valve lips 208 open and close simultaneously).

After the points of the valve lips 208 pass the pivot point 226, the resilient material of the valve lips 208 can relax. Further opening of the valve 106 can occur due to the flow pressure of the fluid being dispensed, the compliance of the hinge section 204, and/or deformation of the valve lips 208. In the open position, a smaller pressure than the check pressure can maintain the valve 106 in the open position. For example, the valve 106 can have a forward check pressure between 6-7 psi to transition from the closed position to the open position, and a full-flow forward flow pressure of 2-3 psi can maintain the valve in the open position. In the open position, the valve 106 permits a high-flow rate with a low flow pressure and low fluid velocity. In other examples, the valve 106 can have a forward check pressure of approximately 1.5 psi or greater and a full flow forward pressure of approximately 0.6 psi. The full flow forward pressure can be influenced by, for example, the viscosity of the fluid flowing through the valve. In some instances, the full flow forward pressure of the fluid can be larger than the pressure to maintain the valve in the open position and the check pressure of the valve.

The valve 106 can be used with fluids having a large range in thermophysical and transport properties. For example, the valve can be used with both high viscosity and low viscosity liquids (e.g., viscosities in the range of 1 cP to 10,000 cP). The valve can also be used with high surface tension and low surface tension liquids. The symmetric opening and closing behavior of the valve can prevent jetting or dripping during the opening or closing process independently of the properties of the liquid.

In the closed position, the thickness 224 of the valve lips 208 allows the valve lips 208 to locally deform around particulates suspended in the fluid (e.g., seeds and fibers) that can stick to the valve lips 208. The valve lips 208 can form a fluid tight seal and provide the check pressure in the presence of particulates due to the local deformations.

Figure 3B:
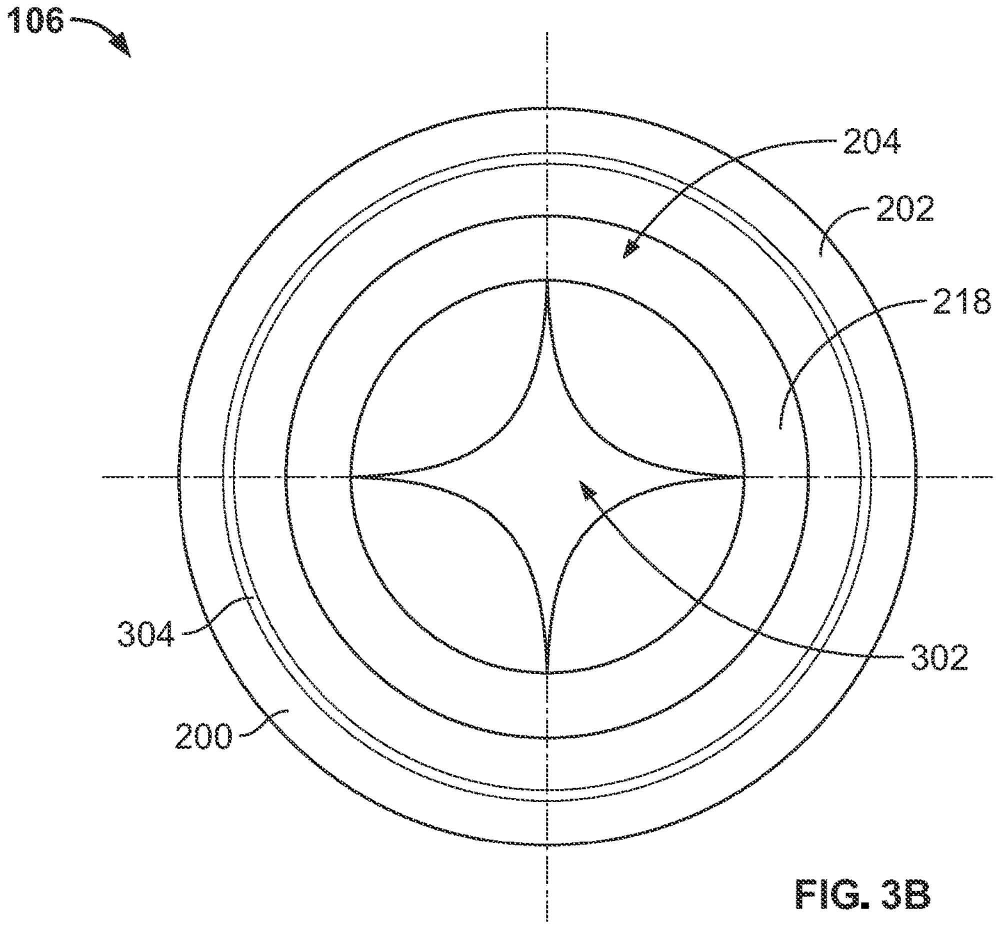

FIGS. 3A-3B show an example valve 106 in an open position. Tips 300 of the valve lips 208 are flexed outward in the direction of the outlet side 212 forming an opening 302 through the center portion 206 of the valve 106. The hinge section 204 allows the displacement of the valve lips 208. In the open position, the rim 202 may remain undeformed. The valve 106 can be maintained in the open position by the flow of a fluid through the opening 302. The valve 106 can transition from the open position to the closed position by decreasing the flow pressure below the pressure needed to keep the valve lips 208 open. For example, the pressure can be decreased by decreasing the flow rate of the fluid flowing through the opening 308. A negative or suction pressure can also be provided on the inlet side of the valve to transition the valve from the open position to the closed position. For example, reversing the flow direction of the fluid can provide a suction pressure to close the valve 106. In some implementations, the pump of a fluid dispensing system can quickly reverse the flow direction to close the valve. In some implementations, the retraction of the sidewalls of a squeeze bottle can provide the suction pressure to close the valve 106. This dynamic closing behavior can allow the valve 106 to close in a dripless manner.

In some implementations, the rim 202 includes a seal bead 304 on the inlet side 210 of the valve body 200. The seal bead 304 can provide a seal between a pump outlet (e.g., 114) and the valve 106 with low deformation of the valve 106. Elastomeric materials can behave like a hydraulic fluid (e.g., compressing the elastomer in one place can cause the elastomer to expand elsewhere). A narrow seal bead has a low volume but a locally high compression force forming the seal. In this manner, deformation of the valve can be limited while a fluid tight seal is formed. Deformation of the valve 106 can also be constrained by a retaining ring (e.g., retaining ring 120). The retaining ring can provide geometric stability to the valve 106. If geometric stability of the valve 106 is not maintained (e.g., the valve is deformed), the contacting surfaces 308 of the valve lips 208 can be affected thereby decreasing performance of the valve 106.

Figure 4:
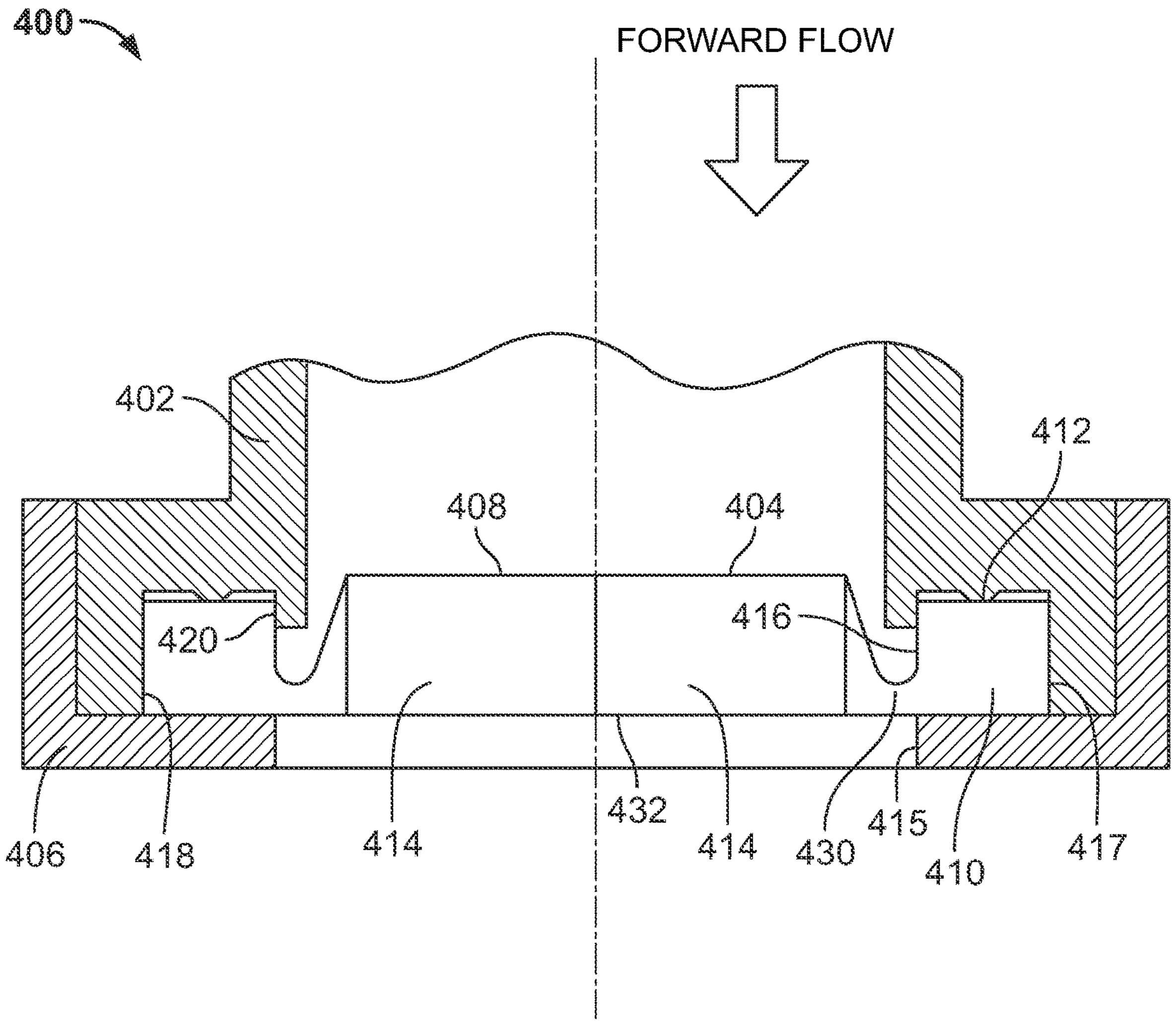
FIG. 4 shows a cross section view of an example valve installed in a fluid dispensing system.

FIG. 4 shows a cross section view of an example outlet 400 of a fluid dispensing system (e.g., 100). The outlet 400 includes a housing 402, a valve 404, and a retaining ring 406. The outlet 400 can be, for example, the outlet of a pump, and the housing 402 can be the pump housing. Other examples of the housing 402 include a pipe, hose, tube, a reservoir housing, or the cap of a squeezable bottle. The inlet side 408 of the valve 404 is compressed against the housing 402 by the retaining ring 406 to form a seal around the rim 410 of the valve 404. The housing 402 can include a seal bead 412. Alternately, the rim 410 can include the seal bead (e.g., seal bead 304); in either case the seal bead 412 creates a locally high interference pressure between the valve 404 and the housing 402 to act as a seal against the flow pressure so that the fluid flow exits through the valve lips 414. The circular opening 415 in the retaining ring 406 has a diameter similar to the inner diameter 416 of the rim of the valve.

The compression force to seal the valve rim 410 to the housing 402 can transmit forces that cause distortion of the valve lips 414. This can result in a valve 404 that leaks in the closed position, and/or, in the dynamic condition, the valve lips 414 can close asymmetrically where one lip rides over an adjacent lip. In some implementations, distortion of the valve lips 414 is prevented by providing a valve 404 with an outside diameter 417 that is a size-for-size fit with the internal diameter 418 of the housing 402 and a rib 420 formed on the housing 402 is a size-for-size fit on the inner diameter 416 of the rim 410, thus the elastomeric rim 410 is dimensionally constrained by the rigid housing 402 and the rib 420. The valve 404 can transition from the open position to the closed position symmetrically and without introducing or entraining air through the valve in the reverse direction.

The valve 404 can have a lower opening pressure in a reverse flow condition (e.g., a reverse check pressure) than in the forward flow condition. The lower reverse check pressure results from the location of the hinge point 430 relative to the outlet side 432 of the valve lips 414. In some implementations, it can be desirable to have a higher opening pressure in the reverse flow condition—for example where cleaning fluid is injected under pressure into a downstream tube near the outlet side 432 of valve 404 to clean the downstream tube. If cleaning fluid passes through the valve 404, the cleaning fluid can contaminate the fluid in the reservoir. The length of the rib 420 in the housing 402 can, in part, prevent the valve from opening in the reverse direction. To increase the reverse check pressure further, a small internal diameter upstream orifice or a backing washer can be inserted adjacent the inlet side 408 of the valve 404 overlapping an outer portion of the valve lips 208. The orifice or backing washer can support the valve lips 414. A smaller orifice in the washer results in a higher reverse flow check pressure.

Figure 5A:
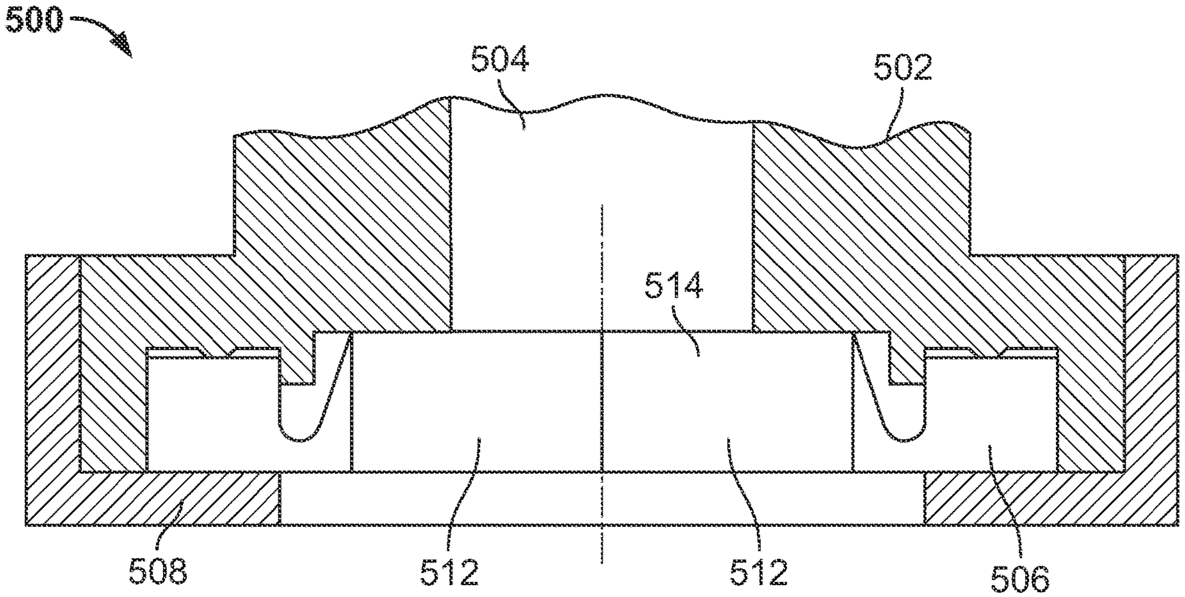
FIGS. 5A-5B show cross section views of an example valve installed in a fluid dispensing system using alternate installation configurations.

FIG. 5A shows a cross section view of an example outlet 500 of a fluid dispensing system (e.g., 100). The outlet 500 includes a housing 502 with an outlet orifice 504, a valve 506 adjacent the outlet orifice 504, and an annular ring 508 to retain the valve 506 against the outlet orifice 504 forming a fluid tight seal. The outlet orifice 504 has a diameter smaller than the diameter of the valve lips 512. In this configuration, the outlet orifice 504 supports the inlet side 514 of the valve lips 512 increasing the reverse check pressure to open the valve 506 in a reverse flow condition. The diameter of the outlet orifice 504 inversely affects the reverse check pressure. For example, decreasing the diameter of the outlet orifice 504 will increase the reverse check flow pressure while increasing the diameter will decrease the reverse check pressure.

Figure 5B:
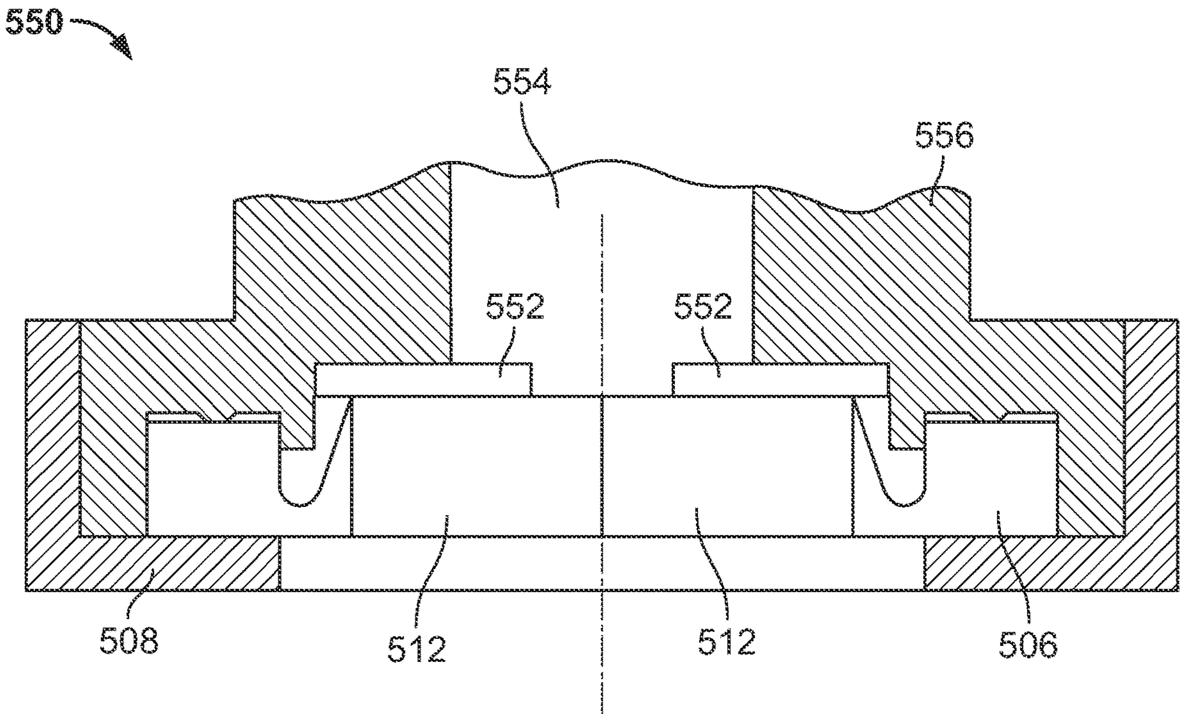

FIG. 5B shows a cross section view of an example outlet 550 of a fluid dispensing system where a backing washer 552 is inserted between the outlet orifice 554 of the housing 556 and the inlet side 558 of the valve 560. Using a backing washer 552 can allow tailoring of the reverse check pressure depending on particular applications and fluids being dispensed. As with the diameter of the outlet orifice, the inner diameter of the backing washer 552 has an inverse relationship with the reverse check pressure.

Figure 6:
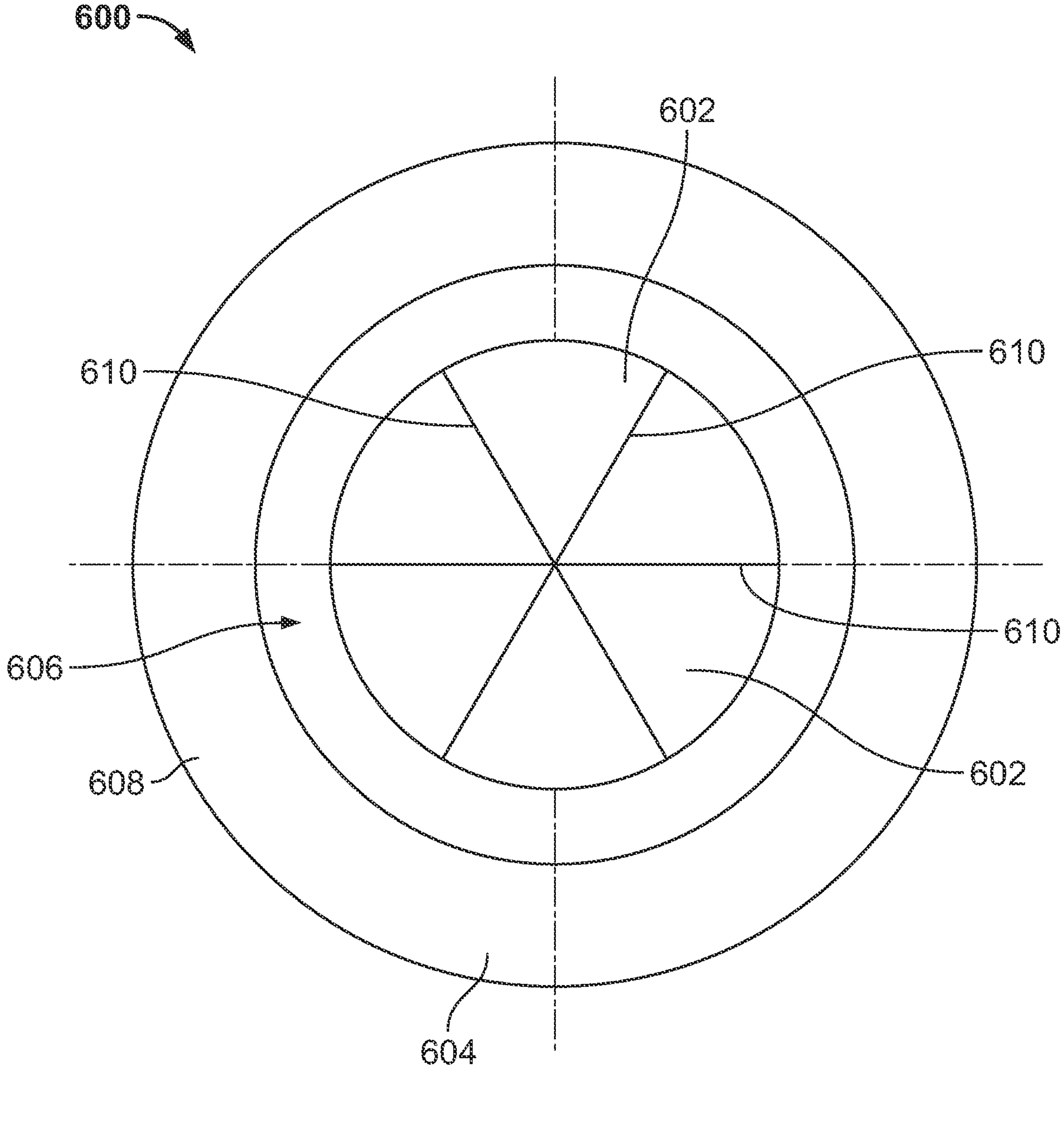
FIG. 6 shows an example variation of the valve of FIG. 1 including different configuration of lips.

FIG. 6 shows a plan view of an example valve 600 including six valve lips 602. The annular rim 604 and hinge section 606 of the valve body 608 can retain similar geometry as discussed previously with other example valves. In this example, the six valve lips 602 are defined by three cross-cuts or slits 610. In some implementations, the valve may have more than six valve lips. In some cases, the valve can have an odd number of valve lips. An advantage of increasing the number of valve lips is a larger open aperture when the valve is in the open position. There can be tradeoffs between having a larger open aperture and the valve retaining a symmetrical closing behavior because more and smaller tips of the valve lips 602 can increase the likelihood of a valve lip overlapping an adjacent valve lip during closing.

Figure 7:
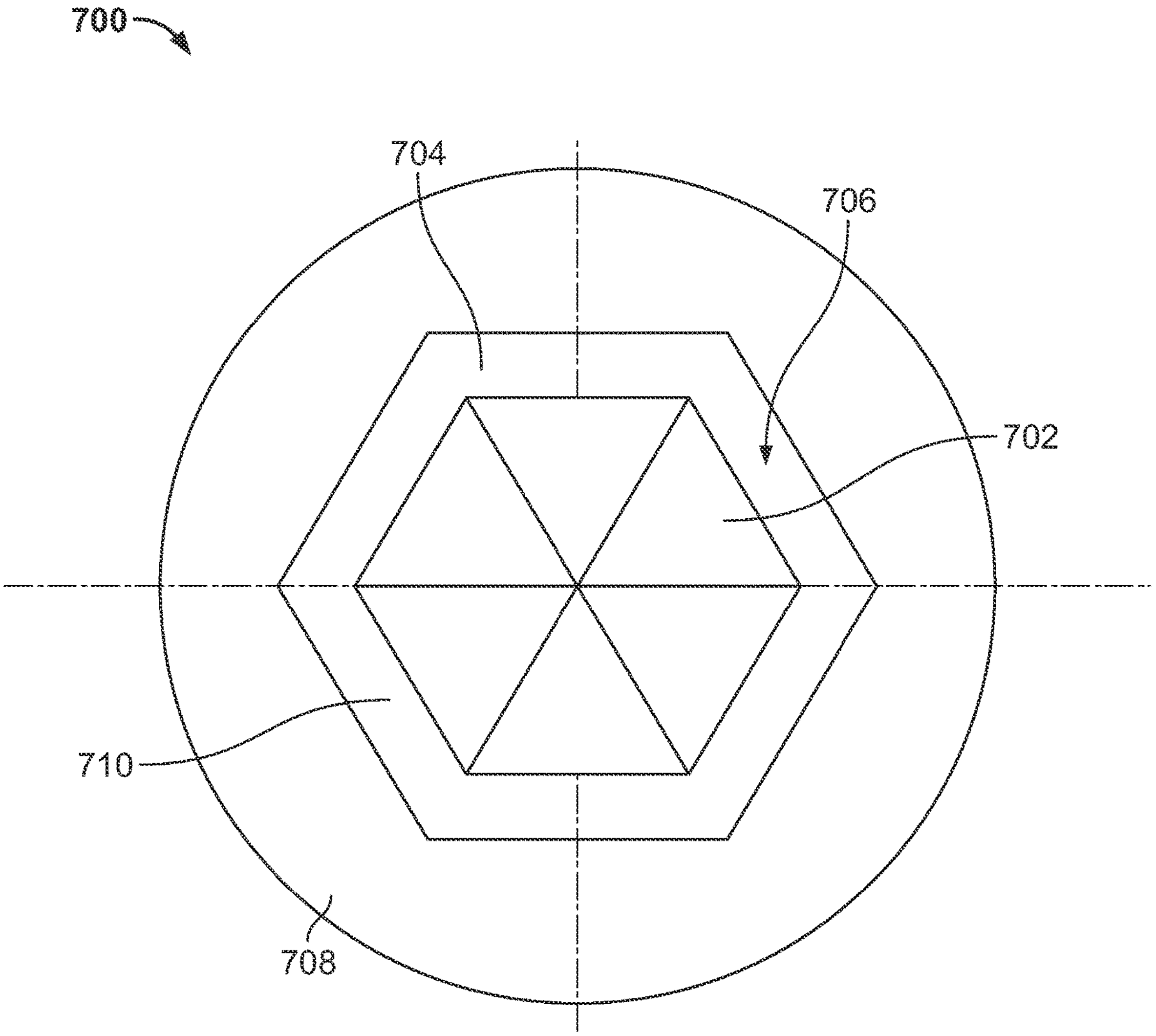
FIG. 7 shows an example variation of the valve of FIG. 1 including a different annular groove shape.

FIG. 7 shows a plan view of an example valve 700 including six valve lips 702 and a hexagonal annular groove 704 in the hinge section 706. The valve body 708 in this example is still circular. An advantage of an annular groove with straight sections 710, as demonstrated by the hexagonal annular groove 704, is more precise control over the hinging of the valve lips 702 when opening the valve. Straight sections 710 can be used with any number of valve lips. In some implementations, the thickness of the resilient material in the hinge section 706 can be adjusted to change the flow pressure necessary to keep the valve 700 in an open condition. To mitigate valve warping and deformation, as discussed with relation to FIG. 4, the outlet housing can be provided with a circular outer diameter and a hexagonal rib to match the geometry of the valve 700.

Figure 8A:
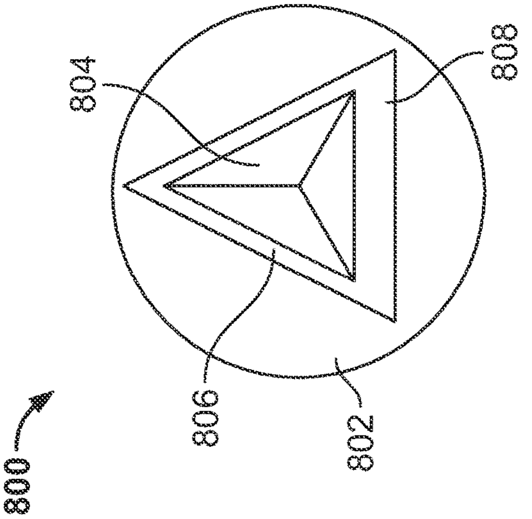
FIGS. 8A-8C show example variations of the valve of FIG. 1 including different annular groove shapes.
Figure 8B:
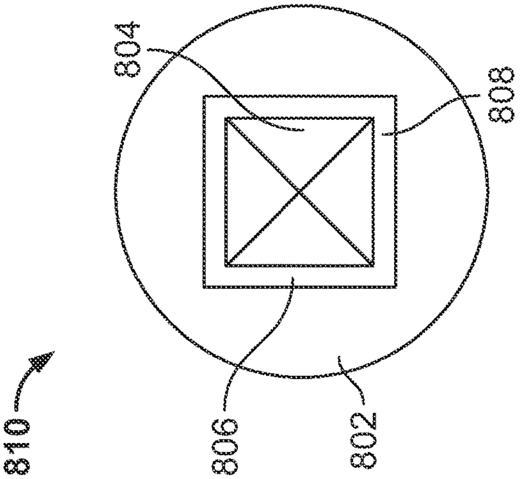
Figure 8C:
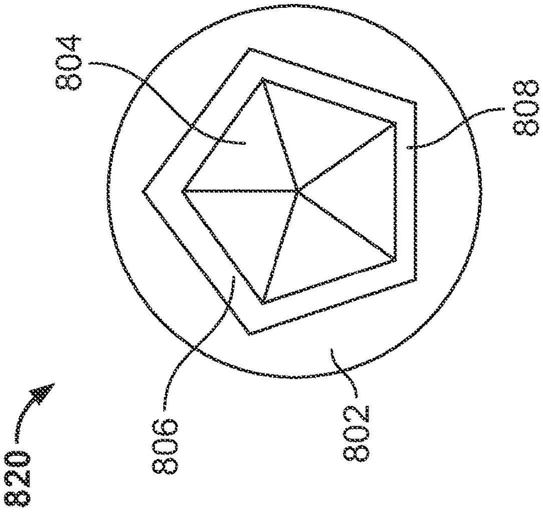

FIG. 8A-8C shows example valve configurations with varying numbers of valve lips. FIG. 8A shows an example valve 800 having a circular valve body 802 and three valve lips 804 and an annular groove 806 with three straight sections 808 in the shape of a triangle. FIG. 8B shows an example valve 810 having four valve lips 804, and four straight sections 808 defining a square annular groove 806. FIG. 8C shows an example valve 820 having a circular valve body 802 and five valve lips 804. Five straight sections 808 define a pentagonal annular groove 806.

Figure 8D:
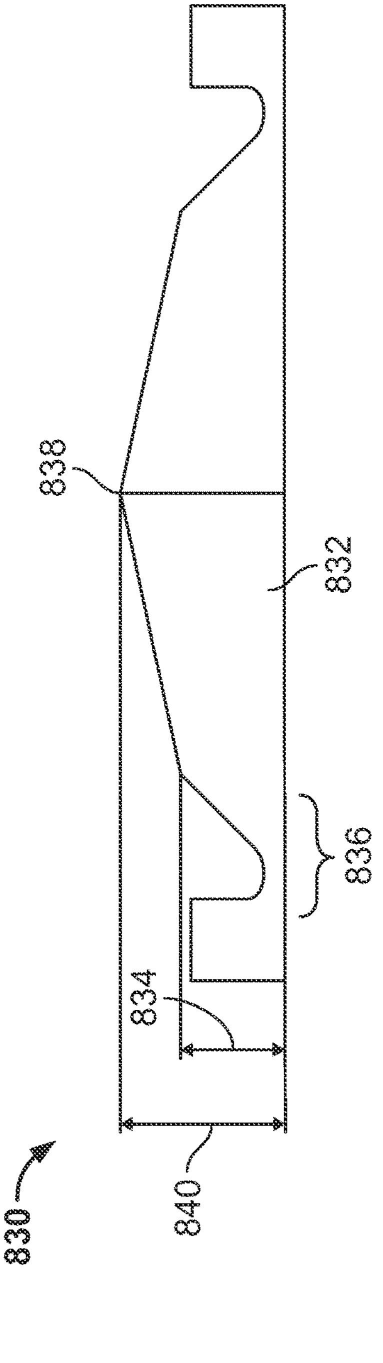
FIG. 8D shows an example variation of the valve of FIG. 1 including lips with increasing thickness.

FIG. 8D shows a cross section of an example valve 830. In this example, the plurality of valve lips 832 have a first thickness 834 near the hinge portion 836. The thickness of the plurality of valve lips 832 increases from the hinge section 836 to the center 838 of the valve 830. The center 838 of the valve has a second thickness 840, which is larger than the first thickness 834.

Figure 9:
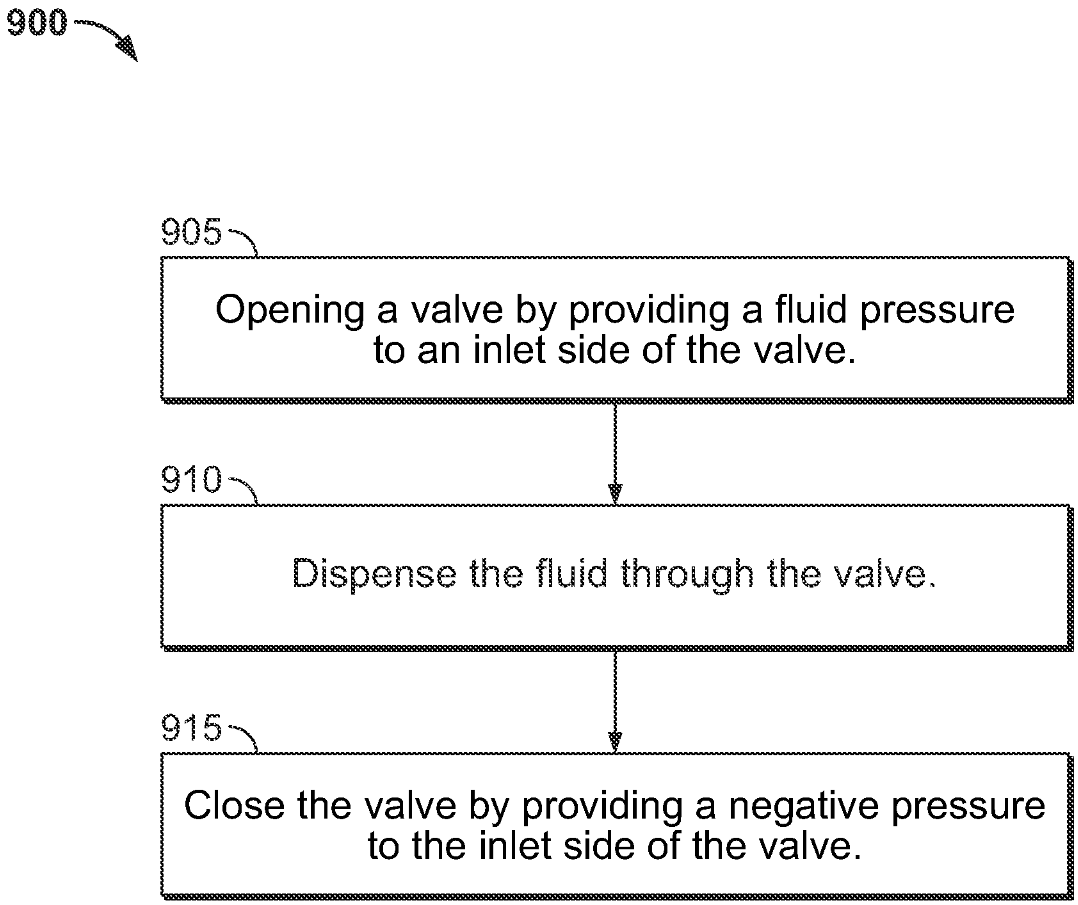
FIG. 9 shows a flow chart for an example method of dispensing a fluid using any of the example valves disclosed herein.

FIG. 9 is a flow chart of an example method 900 for dispensing a fluid. A valve is opened by providing a fluid pressure to an inlet side of the valve (step 905). The fluid pressure is larger than a check pressure of the valve in order for the valve to be opened. The fluid pressure can be provided by example from a pump of a dispensing system. In some implementations, the fluid pressure can be provided by increasing the pressure in the fluid reservoir, for example, by squeezing the reservoir. The fluid is dispensed through the valve (step 910). The flow pressure to keep the valve open can be less than the check pressure of the valve in some implementations. A high flow rate can be maintained during the dispensing step. The valve is closed by providing a suction pressure to the inlet side of the valve (step 915). The suction pressure can be created by reducing the flow pressure below the pressure necessary to keep the valve in the open position. The suction pressure can be generated by reversing a direction of the flow. The valve can close in a symmetric manner preventing undesired jetting or spraying. In some implementations, the valve closes without dripping the fluid being dispensed. In some cases, the valve can close without introducing air through the valve in a reverse flow direction.

A number of implementations of these systems and methods have been described. Nevertheless, it will be understood that various modifications may be made without departing from the scope of this disclosure. Accordingly, other implementations are within the scope of the following claims.

What is claimed is:

1. A check valve comprising:
a valve body formed from a resilient material, the valve body having an inlet side and an outlet side and comprising:
a rim forming an outer periphery of the valve body, the rim having an inlet side surface on the inlet side of the valve body;
a hinge section comprising an annular groove formed on the inlet side of the valve body radially inward of and adjacent to the rim; and
a plurality of lips formed at a center of the valve body by one or more slits extending radially outward from the center of the valve body towards the hinge section,
wherein, in a closed position, a thickness of the plurality of lips extends past the inlet side surface of the rim on the inlet side of the valve body, and
wherein the rim is co-planar with the plurality of lips on the outlet side of the valve body when in the closed position.

2. The check valve of claim 1, wherein a surface extending at least from the center to and including the hinge section is planar on the outlet side of the valve body.

3. The check valve of claim 1, wherein the annular groove comprises a triangle shape, a square shape, a pentagon shape, or a hexagon shape.

4. The check valve of claim 1, further comprising an annular seal bead protruding from the inlet side surface of the rim on the inlet side of the valve body.

5. The check valve of claim 1, wherein the thickness of the plurality of lips is greater than a thickness of the rim.

6. The check valve of claim 1, wherein a thickness of the hinge section is less than a thickness of the plurality of lips.

7. The check valve of claim 6, wherein the annular groove defines a hinge point of the plurality of lips that is offset from a vertical center of the valve body towards the outlet side of the valve body.

8. The check valve of claim 1, wherein a check pressure of the check valve is determined by an offset distance between a hinge point of the plurality of lips and a midpoint of a thickness of the plurality of lips.

9. The check valve of claim 8, wherein the offset distance is determined by a depth of the annular groove.

10. The check valve of claim 1, further comprising:
an open position wherein the plurality of lips are hinged outward from the valve body allowing fluid communication from the inlet side to the outlet side,
wherein a pressure to maintain the check valve in the open position is less than a check pressure of the check valve.

11. The check valve of claim 10, wherein the check pressure of the check valve is between 6-7 psi.

12. A dispensing system comprising:
a reservoir;
a pump comprising an inlet and an outlet, the inlet fluidly coupled to the reservoir;
a valve fluidly coupled to the outlet of the pump, the valve comprising:
a valve body formed from a resilient material, the valve body having an inlet side and an outlet side and comprising:
a rim forming an outer periphery of the valve body, the rim having an inlet side surface on the inlet side of the valve;
a hinge section comprising an annular groove formed on the inlet side of the valve body radially inward of and adjacent to the rim; and a plurality of lips formed at a center of the valve body by one or more slits extending radially outward from the center of the valve body towards the hinge section, wherein, in a closed position, a thickness of the plurality of lips extends past the inlet side surface of the rim on the inlet side of the valve body, and wherein the rim is co-planar with the plurality of lips on the outlet side of the valve body when in the closed position.

13. The system of claim 12, further comprising a ring that defines a central opening in the ring, the ring connected to the outlet of the pump wherein the rim of the valve is retained between the ring and the outlet of the pump.

14. The system of claim 12, wherein the valve provides a check pressure against forward flow, the check pressure being greater than a hydrostatic pressure from fluid in the reservoir with the reservoir full.

15. The system of claim 12, wherein the pump provides sufficient pressure to open the valve.

16. The system of claim 12, wherein the valve and the pump are integrated with the reservoir as a single use item.

17. The system of claim 12, wherein a reverse check pressure of the valve is determined by an inner diameter of the outlet of the pump.

18. The system of claim 12, further comprising:

a backing washer with an inner diameter smaller than an inner diameter of the outlet of the pump, the backing washer positioned between the outlet of the pump and the inlet side of the valve body, wherein a reverse check pressure of the valve is determined by the inner diameter of the backing washer.

19. The system of claim 12, wherein the valve comprises:

the closed position wherein edges of the plurality of lips are in-plane with the valve body preventing fluid communication through the valve; and an open position wherein the plurality of lips are hinged outward from the valve body allowing fluid communication from the inlet side to the outlet side, and wherein the edges of the plurality of lips on the inlet side of the valve body are compressed when transitioning from the closed position to the open position.

20. The system of claim 19, wherein the valve is configured to transition from the open position to the closed position in response to a negative pressure at the inlet side.

21. The system of claim 20, wherein no air is entrained into the reservoir when the valve transitions from the open position to the closed position.

22. A check valve comprising:

a valve body formed from a resilient material, the valve body having an inlet side and an outlet side and comprising:

a rim forming an outer periphery of the valve body;

a hinge section comprising an annular groove formed on the inlet side of the valve body radially inward of and adjacent to the rim; and a plurality of lips formed at a center of the valve body by one or more slits extending radially outward from the center of the valve body towards the hinge section, and wherein a thickness of the plurality of lips is greater than a thickness of the rim, and wherein an overall height of the valve body as defined by the thickness of the plurality of lips is greater than a thickness of the rim.

23. The check valve of claim 22, wherein a surface extending at least from the center to and including the hinge section is planar on the outlet side of the valve body.

24. The check valve of claim 22, wherein a thickness of the hinge section is less than a thickness of the rim.

25. The check valve of claim 22, further comprising:

an open position wherein the plurality of lips are hinged outward from the valve body allowing fluid communication from the inlet side to the outlet side, wherein a pressure to maintain the check valve in the open position is less than a check pressure of the check valve.

26. The check valve of claim 25, wherein the check pressure of the check valve is between 6-7 psi.

* * * * *